US010502459B1

(12) United States Patent
Armijo et al.

(10) Patent No.: US 10,502,459 B1
(45) Date of Patent: Dec. 10, 2019

(54) MAGNETIC FIELD FALLING PARTICLE SOLAR RECEIVER SYSTEMS AND METHODS

(71) Applicants: National Technology & Engineering Solutions of Sandia, LLC, Albuquerque, NM (US); Malay Mazumder, Belmont, MA (US)

(72) Inventors: Kenneth M. Armijo, Albuquerque, NM (US); Ryan R. Anderson, Albuquerque, NM (US); Sean Michael Babiniec, Albuquerque, NM (US); Clifford K. Ho, Albuquerque, NM (US); Malay Mazumder, Belmont, MA (US)

(73) Assignees: National Technology & Engineering Solutions of Sandia, LLC, Albuquerque, NM (US); Malay Mazumder, Belmont, MA (US)

( * ) Notice: Subject to any disclaimer, the term of this patent is extended or adjusted under 35 U.S.C. 154(b) by 658 days.

(21) Appl. No.: 15/142,968

(22) Filed: Apr. 29, 2016

Related U.S. Application Data (60) Provisional application No. 62/154,922, filed on Apr. 30, 2015.

(51) Int. Cl.
*F24S 90/00* (2018.01)

(52) U.S. Cl.
CPC ................................ *F24S 90/00* (2018.05)

(58) Field of Classification Search
CPC ...................................................... F24S 90/00
See application file for complete search history.

(56) References Cited

U.S. PATENT DOCUMENTS

| 4,191,901 | A | 3/1980 | Branover |
| 4,275,318 | A | 6/1981 | Duncan |
| 4,419,982 | A | 12/1983 | Eckels |
| 5,772,792 | A | 6/1998 | Zimmermann |
| 7,133,183 | B2 | 11/2006 | Rabinowitz |
| 2013/0263535 | A1* | 10/2013 | Bertsch ................ F24S 80/70 52/173.3 |

* cited by examiner

*Primary Examiner* — Alfred Basichas
(74) *Attorney, Agent, or Firm* — Daniel J. Jenkins (57) ABSTRACT

Systems and methods that increase the residence time of particles falling through a solar receiver using an induced magnetic field to suspend or slow down and/or alter the flight path of the particles falling through the concentrated beam of sunlight are disclosed.

13 Claims, 6 Drawing Sheets

MAGNETIC FIELD FALLING PARTICLE SOLAR RECEIVER SYSTEMS AND METHODS

CROSS-REFERENCE TO RELATED APPLICATIONS

This application claims benefit of U.S. Provisional Patent Application No. 61/154,922, "MAGNETIC FIELD FALLING PARTICLE SOLAR RECEIVER SYSTEMS AND METHODS", filed Apr. 30, 2015, which is incorporated by reference herein in its entirety.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to solar energy. The present disclosure is more particularly directed to controlling falling particle flow through solar receivers by magnetic fields.

BACKGROUND

Solar power systems offer much promise for clean energy, with few, or zero, carbon emissions. These systems collect incident sunlight and convert this sunlight into a usable form of power, such as heat or electricity. Solar energy offers a clean, inexhaustible, sustainable solution to energy demands and has the potential to supply a very significant fraction of U.S. and global electricity consumption. While the U.S. and global solar power potential is known to be immense, solar power systems have not been economically competitive without government support, to date. Challenges remain to devise solar technologies that can lower installation costs, increase power output, and lower the marginal cost per unit energy produced for a lower levelized cost of energy.

Emerging solar power systems such as concentrating solar power (CSP) systems include falling particle solar receivers that heat particles for energy conversion, energy storage, thermochemical processes, electricity production, and process heating. Present falling particle receivers utilizing gravity to flow particles through the receiver are sensitive to the particle residence time within a concentrated beam of sunlight. Direct absorption solid particle receivers that employ this methodology have the potential to achieve heat-transfer media temperatures of ~1000° C. However, depending on particle size and external forces that can alter particle flow (e.g., external wind and flow due to convective heat losses); optimized particle flow can be severely affected, which can reduce the receiver efficiency. These previously disclosed processes and systems are not efficient in capturing solar energy to heat particles, which increase costs.

Prior art has utilized screens, porous media, baffling, and louvered obstructions for increased residence time of falling particles. However, issues with thermal-mechanical fatigue, damage/melting from the concentrated solar flux, and increased costs and maintenance present limitations.

The need remains, therefore, for CSP falling particle solar receivers and methods that more efficiently capture solar energy by heating particles for energy conversion, storage, and thermal processes.

SUMMARY OF THE DISCLOSURE

The present disclosure is directed to systems and methods for improving particle flow stabilization and/or to increase particle residence time in concentrated solar power system (CSP) falling particle receivers. The disclosed systems and methods impose a magnetic field or fields upon falling particles within the receiver to achieve these benefits.

In an embodiment of the present invention, a falling particle solar receivers and methods are disclosed wherein the falling particle receiver imposes a magnetic field to reduce particle flow destabilization and/or to increase the particle residence time in the receiver that and increases heat transfer and mixing within the particles.

The disclosed systems and methods increase the residence time of particles falling through a solar receiver using a magnetic field or fields to suspend or slow down the particles falling through the concentrated beam of sunlight as a result of an induced "magnetic buoyancy" and/or to increased travel distance of the particles through the receiver. In an embodiment of the present invention, the disclosed systems and methods impose a magnetic field or fields to reduce particle flow destabilization and increase heat transfer and mixing within the particles for more uniform heating.

According to an embodiment of the present disclosure, a falling particle solar receiver is disclosed that includes a receiver body comprising one or more walls defining an interior space, a window in the receiver body for allowing concentrated solar energy to enter the interior space, an inlet for allowing particles to enter and fall through the interior space and a magnetic field generating component configured to induce a magnetic field upon the particles falling through the interior space.

According to another embodiment of the present disclosure, a falling particle solar receiver system is disclosed that includes a particle feed system, a falling particle solar receiver for receiving particles from the particle feed system, and a collection system for receiving particles discharged from the falling particle solar receiver. The falling particle solar receiver includes a receiver body comprising one or more walls defining an interior space, a window in the receiver body for allowing concentrated solar energy to enter the interior space, an inlet for allowing particles to enter and fall through the interior space and a magnetic field generating component configured to induce a magnetic field upon the particles falling through the interior space.

According to the present disclosure, a method of heating particles in a falling particle receiver is disclosed that includes providing a plurality of particles to the receiver, heating the particles falling through the receiver, and subjecting the particles to a magnetic field as the particles fall through the receiver.

An advantage of the present disclosure is that the residence time of particles receiving concentrated solar energy is increased.

Another advantage of the present disclosure is more uniform receiver outlet particle temperatures for paramagnetic/ferromagnetic particles due to the properties of the Curie temperature. This "heat-filtering" can present an advantage since the Curie temperature of particles will increase the uniformity of particle outlet temperature across particles of different sizes. Larger particles, which may heat slower, will de-magnetize slower, and remain influenced by the magnetic field over longer periods of time when compared to smaller particles. This could result in increased residence times for larger particles generally.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The magnetic field may be imposed upon particles selected from the group including (1) diamagnetic particles, (2) paramagnetic/ferromagnetic particles and (3) non-magnetic charged particles. The approaches vary based on directionality, strength and mechanism of particle magnetic moments μ. In an embodiment, the disclosed CSP receivers may operate at temperatures above 700° C., and may include storage capabilities which can be used to reduce levelized cost of electricity (LCOE).

According to an embodiment of the disclosure, magnetic fields or electromagnets are used to suspend or slow down the particles as they fall through a receiver. In an embodiment, the particle composition may include a magnetic material (e.g., iron oxide). In an embodiment, magnets can be placed near the release point or just above the illuminated region to attract the particles and slow down their fall.

In an embodiment, the particles are small, solid particles between 100 microns and 1000 microns for heat-transfer and direct-storage media for concentrating solar power (CSP) plants. Solid particles are released at the top of a receiver where they fall through a concentrated beam of sunlight produced by a field of heliostats. The directly irradiated particles can get much hotter than conventional heat-transfer fluids (e.g., molten salt), achieving temperatures greater than 1000° C. The disclosed systems and methods increase the residence time of the particles in the concentrated beam of sunlight so that they can achieve desired temperatures.

Depending on the size and magnetic properties of some types of particles, the magnetic field may be generated by different magnets of different field strengths, such as magnetic generators, permanent magnets, electromagnetics or (EM) pumps.

For ferromagnetic particles, as the ferromagnetic particles heat up and approach their Curie temperature, they lose their magnetism. Thus, the particles would free-fall once their Curie temperature was reached. The Curie temperatures of several materials that match desired operating temperatures for CSP plants are as follows: Iron: 1043 K Cobalt: 1400 K Iron Oxide (Fe2O3): 948 K Alnico: 973-1133 K. In another embodiment, an induced electromagnetic field could be used within the receiver to slow down the falling particles.

In an embodiment, the magnetic field may be pulsed on and off to control the speed of the falling particles. For example, electromagnets could be placed near the top of the receiver and/or on either side of the receiver (inside the cavity but outside the concentrated beam). The electromagnets could be turned on and off to cause the particles to slow down and/or move side to side as they are attracted to the magnets. The electromagnetic pulses would cause a lifting and/or sideways force to offset gravitational acceleration. In another embodiment, the magnetic field may be continuously applied to the particles. The composition of the particles and the magnetic fields would be designed to optimize the residence time and heating of the particles falling through the receiver.

In an embodiment, diamagnetic material particles are used to create an induced internal magnetic field proportional to and in a direction opposite to an externally applied magnetic field, and are repelled from regions of increasing magnetic field strength. Diamagnetic properties are not affected by temperature. In an embodiment, highly diamagnetic materials such as pyrolytic carbon and a silver micropowder, with magnetic susceptibility properties greater than zero, and melting temperatures of 3650° C. and 961° C., respectively, can used. As the particles fall through the receiver, they are impacted by the magnetic field and have attenuated flow. In an embodiment, the particles may be tracked with video images and temperature measurements to evaluate particle curtain thickness and thermal properties.

In an embodiment, non-magnetic dielectric particles are used. In an embodiment, these dielectric particles traveling through the receiver system accumulate charge due to collisions with each other and with the walls of the ducting. Charged particles moving through a magnetic field experience a Lorentz force proportional to the particle velocity and the magnetic field strength. Proper design of a magnetic field within the receiver cavity allows deflection of the particles to increase their residence time within the solar flux. In an embodiment, the system and method are configured so that the particles accumulate enough charge so that the particle curtain functions as a dusty plasma and plasma confinement techniques are used to control particle flow in the receiver. In an embodiment, plasma "magnetic bottle" traps that use steep magnetic field gradients to confine particles to regions where the magnetic field is weaker are used. In an embodiment, field strength is increased at the bottom receiver to provide upward force to increase particle residence time.

Figure 1:
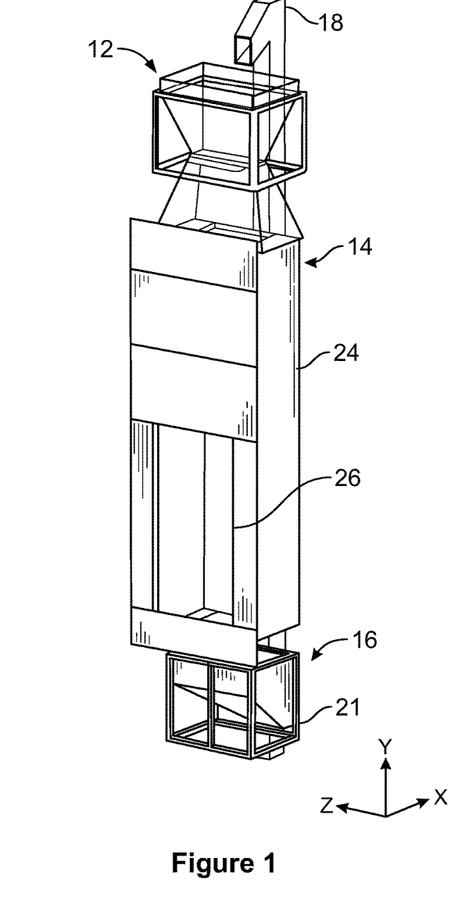
FIG. 1 illustrates a concentrated solar power falling particle receiver system according to an embodiment of the disclosure.

FIG. 1 illustrates a concentrated solar power (CSP) falling particle receiver system (receiver system) 10 according to an embodiment of the present disclosure. The receiver system 10 includes a particle feed system 12, a solar receiver (receiver) 14 and a collection system 16. The receiver system 10 and method of heating falling particles by CSP may be similar to those systems disclosed by Ho, C. K., S. S. Khalsa, and N. P. Siegel, 2009, Modeling on-Sun Tests of a Prototype Solid Particle Receiver for Concentrating Solar Power Processes and Storage, in ES2009: Proceedings of the ASME 3rd International Conference on Energy Sustainability, Vol 2, San Francisco, Calif., included by reference in its entirety. The presently disclosed systems being distinguishable from the earlier disclosed systems by the use of a magnetic field or fields to reduce particle flow destabilization and/or increase the particle residence time in the receiver.

The particle feed system 12 provides particles to the solar receiver 14. In this exemplary embodiment, the particle feed system 12 includes a particle conveyor 18 and a feed hopper (hopper) 20 to an inlet 22 of the receiver 14. In this exemplary embodiment, the particle conveyor 18 is a bucket elevator, however, in other embodiments, the particle conveyor 18 may be, a bucket elevator, screw conveyor, (Inventors, expand here) or other conveyor for providing particles to the hopper 20. In this exemplary embodiment, the collection system 16 includes a collection hopper 21. In other embodiments, the collection system 16 may include hoppers, conveyors or other collection components for collecting particles for transport.

The receiver 14 includes a receiver body 24 having an aperture or window 26 for allowing concentrated solar light or energy to enter the receiver body 24. In this exemplary embodiment, the window 26 is an open space or direct aperture. In other embodiments, the window 26 may be plate of a high temperature material transparent to solar energy, such as, but not limited to high temperature quartz.

The receiver body 24 also has an inlet 22, discussed above, for allowing particles to be fed to the receiver body 24. In this exemplary embodiment, the receiver body 24 has one inlet 22. In other embodiments, and as discussed below, the receiver body 24 may have one or more inlets for forming one or more corresponding falling particle streams or curtains. In other embodiments, the receiver system 10 may include one or more feed systems including one or more particle conveyors and hoppers for providing particles to one or more inlets. For example, the receiver system 10 may include two particles conveyors for providing particles to two hoppers that provide particles to two inlets for forming two falling particle curtains. At least part of this embodiment regarding multiple curtains will be discussed below in more detail in discussing FIG. 5.

Figure 1A:
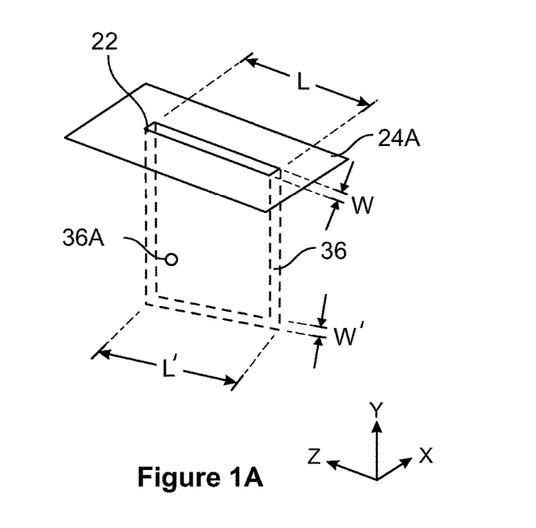
FIG. 1A shows the top panel of the receiver body of FIG. 1.

FIG. 1A shows the receiver body top 24A of the receiver body 24 of FIG. 1. As can be seen in FIG. 1A, the receiver body top 24 includes the inlet 22 passing there through. The inlet has a width W and a length L that extend along the X and Z axis as shown. Also shown in FIG. 1A is a particle curtain 36 that is formed by a plurality of particles 36A (represented by a single particle in the drawing) that are fed to the inlet 22 and that fall there through into an interior space 31 (see FIG. 2) of the receiver body 24 (see FIG. 1). The particle curtain 36 has a width W' and a length L'. The length L' and width W' of the particle curtain 36 is the same as the length L and width W of the window at the point where the particles fall from the opening 22. The length L' and width W' of the particle curtain 22 varies as the particles fall through the interior space 31 (see FIG. 2) of the receiver body 24 because of particle heating, particle-to-particle interactions and interactions with the magnetic field 34. The channel geometry, geometry of the magnetic field, including direction and magnitudes can also be modulated which would impact the relative transport of the particles.

In the exemplary embodiment shown in FIGS. 1 and 1A, the inlet 22 has a rectangular cross-section. In other embodiments, the inlet 22 may have a non-rectangular cross-section, such as, but not limited to saw-toothed or corrugated, sine wave, and joined semi-circles. These other cross-sections may be selected to further influence the transport of the magnetic particles within the receiver. In an embodiment, columns of vertically mounted magnets (see magnet discussion below) may be positioned in a staggered configuration with a saw-toothed or corrugated curtain geometry to further enhance particle transport and residence time.

Figure 2:
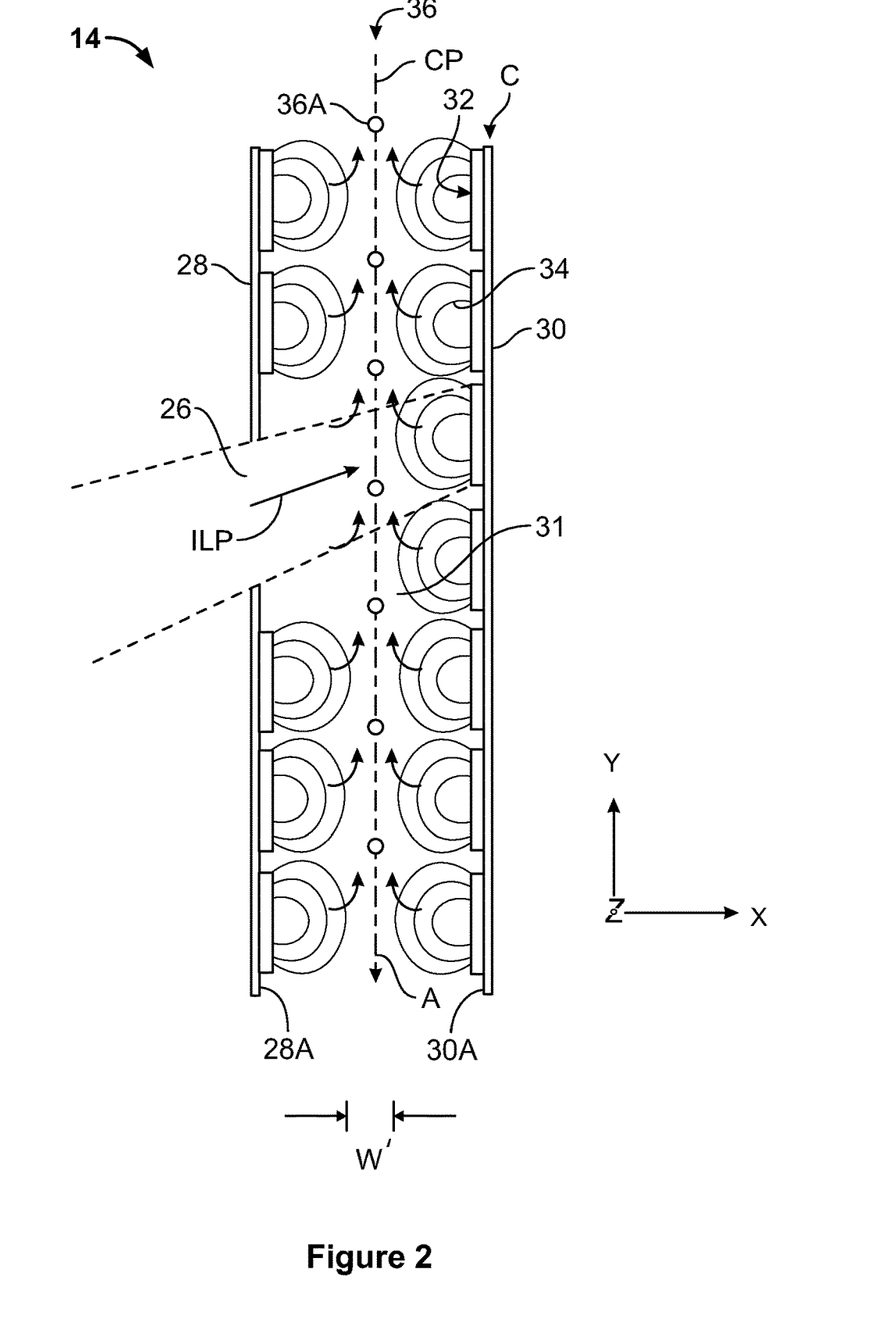
FIG. 2 is a cross-section view of a portion of the solar receiver of FIG. 1.

FIG. 2 is a cross-section of a portion of the receiver body 24 of FIG. 1. As can be seen in FIG. 2, the receiver body 24 includes a front wall 28 and a rear wall 30. The front and rear walls 28, 30 at least partially define an interior space 31. The front and rear walls 28, 30 include front and rear interior sides 28A, 30A, respectively. In this exemplary embodiment, the receiver body walls are vertical, however in other embodiments, the receiver system 10 can incorporate a sloped geometry which can impact field lines that can potentially enhance particle residence time.

The front and rear interior sides 28A, 30A have a plurality of magnets 32 disposed thereupon. The magnets 32 create magnetic fields represented by magnetic field lines 34. In this exemplary embodiment, the magnets 32 are permanent magnets. The permanent magnets may be, but are not limited to rare earth magnets, ceramic magnets, ferrous alloy magnets, alloy/oxide ceramic magnets and alnico magnets. The rare earth magnets, may be, but are not limited to neodymium and samarium alloys. In another embodiment, the permanent magnets may be totally or partially replaced with magnetic field generators, such as electromagnets, for generating magnetic fields into the interior space 31. The plurality of magnets 32 are disposed in vertical columns C upon the front and rear interior sides 28A, 30A. A plurality of vertical columns are placed along the Z axis (see FIGS. 1, 1A, 2) along the length L' of the particle curtain 36.

In FIG. 2, the particle curtain 36 (represented by a single particle 36A falling though the interior space 31) fall through the interior space 31 of the receiver body 24. In this exemplary embodiment, the particles 36A (FIG. 1A) forming the particle curtain 36 are diamagnetic particles. The externally applied magnetic field induces a magnetic moment in the diamagnetic materials that is in the opposite direction of the external magnetic field. The induced magnetic moment causes the diamagnetic material to be repelled from the space where the external magnetic field is stronger. The diamagnetic particles may be formed of pyrolytic carbon and silver micro-powder, or particles formed of other diamagnetic materials.

As discussed above, the particle curtain 36 has a width W' that initially corresponds to the width (not shown) of the inlet 22. The particle curtain 36 also has a length L' along the Z axis that initially corresponds with the length of the inlet 22 The width W of the curtain varies as the particles fall through the interior space due to particle heating, particle-to-particle interactions and interactions with the magnetic fields 34. To further influence the transport of the magnetic particles within the receiver, the particle curtain may also have a non-purely rectangular geometry. Since the vertically mounted magnets may also be positioned in a staggered configuration, a saw-toothed or corrugated curtain geometry could further enhance particle transport (especially for ferromagnetic particles) and residence time, due to an initial closer proximity between the injected particles and seated magnets.

As the particles 36A fall or flow down through the interior space 31 in the downward direction indicated by the arrow A, the width W' of the curtain is bisected by the central plane CP of the interior space 31. In other embodiments, the inlet 22 may or may not be arranged such that the curtain flows down the central plane CP of the interior space and may be placed further or back along the X axis, and the magnetic fields 34 (discussed below) of the magnets 32 may be adjusted and/or varied to compensate for the change of distance from the magnets 34.

The particles 36A are heated by concentrated solar light or energy traveling through the window 26 along an incident light path ILP. The amount of heat the particles 36A can absorb is dependent upon the residence time of the particles in the interior space 31, and mostly dependent upon the residence time of the particles 36A in the incident light path ILP. The magnets 32 effect the residence time of the particles 36A by applying a force to the particles 36A to create a "buoyancy effect" that offsets gravity and slows the fall of particles 36A through the interior space 31. In this exemplary embodiment, the magnets 32 are of equal magnetic field strength and symmetrically arranged in interior space 31, however, in other embodiments, the magnets 32 may be of different magnetic field strength and may be asymmetrically spaced. For example, the magnets of increasing field strength may be arranged so that the particles 36A encounter magnets of increasing field strength as they fall through the interior space. In another example, magnets 32 may be arranged such that no magnet is on the opposing interior surface from one another, thereby imparting a zig-zag motion to the falling particles 36A that increases residence time.

On charged particles, the arrangement of magnets and the effects will be similar to diamagnetic particles. Charged particles process around magnetic field lines ("gyromagnetic motion") as they fall through the space. The gyromagnetic motion gives the particle an effective magnetic moment in the opposite direction of the external magnetic field, which causes the particle to be repelled from regions of strong magnetic fields.

For ferromagnetic particles, the ferromagnetic particles will align their magnetic moment to be in the same direction as the external magnetic field, and so will be attracted to regions of strong magnetic fields. Therefore the magnetic field gradient would need to be reversed for ferromagnetic particles.

Figure 3:
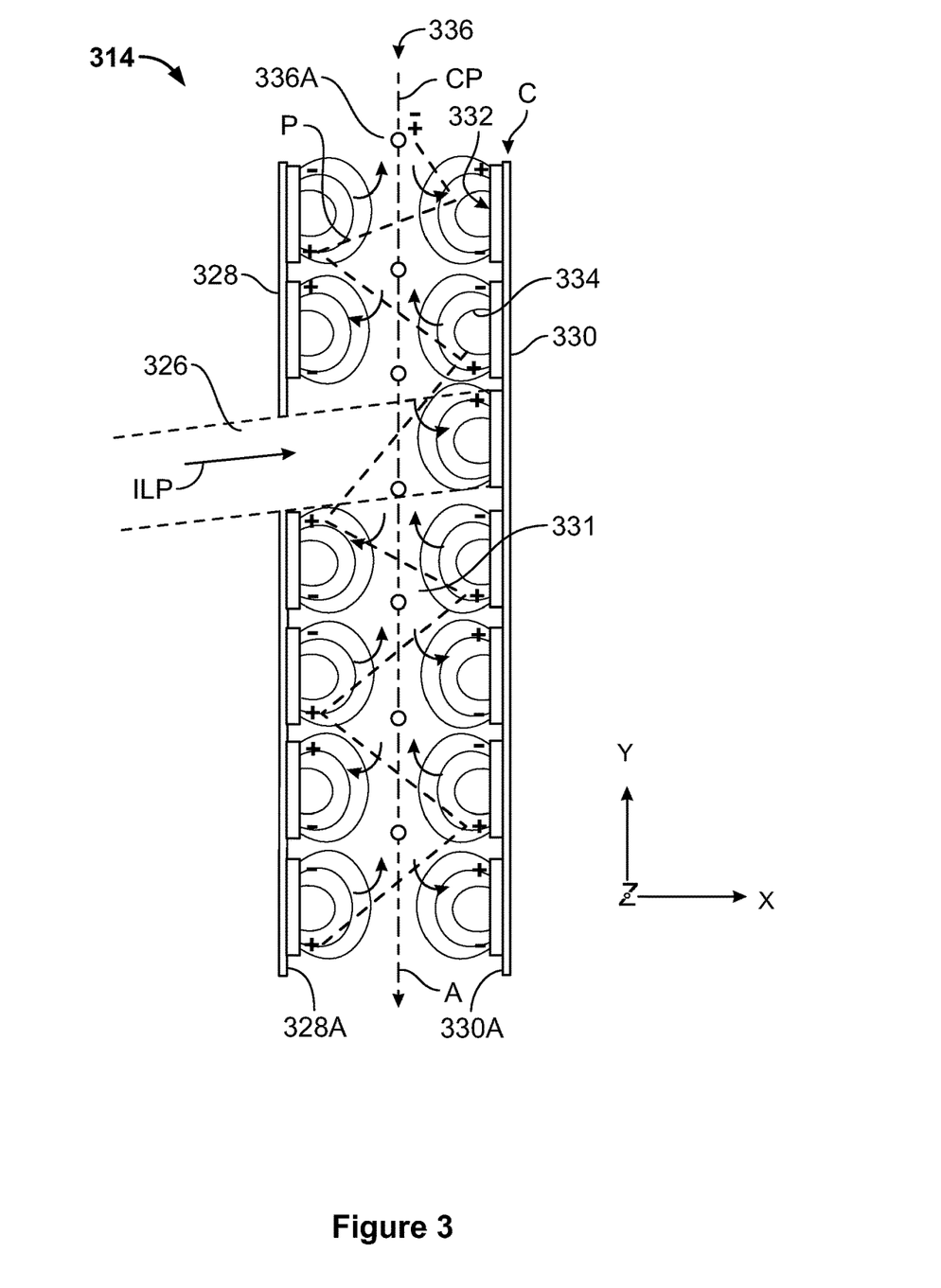
FIG. 3 is a cross-section view of a portion of another solar receiver according to an embodiment of the disclosure.

FIG. 3 shows is a cross-section of a portion of another receiver body 324 according to an embodiment of the disclosure. As can be seen in FIG. 3, the receiver body 324 includes a front wall 328 and a rear wall 330. The front and rear walls 328, 330 at least partially define an interior space 331. The front and rear walls 328, 330 include front and rear interior sides 328A, 330A, respectively.

The front and rear interior sides 328A, 330A have a plurality of magnets 332 disposed thereupon. The magnets 332 create magnetic fields represented by magnetic field lines 334. In this exemplary embodiment, the magnets 332 are permanent magnets. The permanent magnets may be, but are not limited to rare earth magnets, ceramic magnets, ferrous alloy magnets, alloy/oxide ceramic magnets and alnico magnets. The rare earth magnets may be, but are not limited to neodymium and samarium alloys. In another embodiment, the permanent magnets may be totally or partially replaced with magnetic field generators or electromagnets, for generating magnetic fields into the interior space 331. The plurality of magnets 332 are disposed in vertical columns C upon the front and rear interior sides 328A, 330A. A plurality of vertical columns are placed along the Z axis (see FIGS. 1, 1A, 3) along the length L' of the particle curtain 336.

In FIG. 3, the particle curtain 336 (represented by a single particle 336A falling though the interior space 331) falls through the interior space 331 of the receiver body 324. In this exemplary embodiment, the particles 336A forming the particle curtain 336 are ferromagnetic particles, and in particular, ferromagnetic particles Ferromagnetic particles have a high susceptibility to magnetization, the strength of which depends on that of the applied magnetizing field, and that may persist after removal of the applied field. The ferromagnetic particles 336A are shown in FIG. 3 as round, however, as appreciated by one of ordinary skill in the art, ferromagnetic particles would have a non-spherical shape, even if slightly non-spherical, that would allow the particle to be magnetic or to have a magnetism induced thereupon such that the particles would have positive and negative poles. The ferromagnetic particles may be iron oxides, alnico magnet grains, or bismuth ferrite, or particles formed of other ferromagnetic materials. In an embodiment, the iron oxide may be magnetite.

As discussed above, the particle curtain 36 has a width W' that initially corresponds to the width (not shown) of the inlet 22. The particle curtain 36 also has a length L' along the Z axis that initially corresponds with the length of the inlet 22 The width W' of the curtain varies as the particles fall through the interior space due to particle heating, particle-to-particle interactions and interactions with the magnets 32. In particular, the ferromagnetic particles 336A are pulled and pushed in directions away from the center line CL as indicated by line P as the particles are attached and repelled by the magnetic fields of the magnets 332. In FIG. 3, line P is exaggerated and not to scale so as to show movement. In this manner, the movement of the particles 336A increases residence time as discussed below.

As the particles 336A fall or flow down through the interior space 331 in the downward direction indicated by the arrow A, the width W' of the curtain is bisected by the central plane CP of the interior space 331. In other embodiments, the inlet 322 may or may not be arranged such that the curtain flows down the central plane CP of the interior space and may be placed further or back along the X axis, and the magnetic fields 334 (discussed below) of the magnets 332 may be adjusted and/or varied to compensate for the change of distance from the magnets 334.

The particles 336A are heated by concentrated solar light or energy traveling through the window 326 along an incident light path ILP. The amount of heat the particles 336A can absorb is dependent upon the residence time of the particles in the interior space 331, and mostly dependent upon the residence time of the particles 336A in the incident light path ILP. The magnets 332 effect the residence time of the particles 336A by applying a force to the particles 336A as discussed above. In this exemplary embodiment, the magnets 332 are of equal magnetic field strength and symmetrically arranged in interior space 331, however, in other embodiments, the magnets 332 may be of different magnetic field strength and may be asymmetrically spaced. For example, the magnets of increasing field strength may be arranged so that the particles 336A encounter magnets of increasing field strength as they fall through the interior space.

Figure 4:
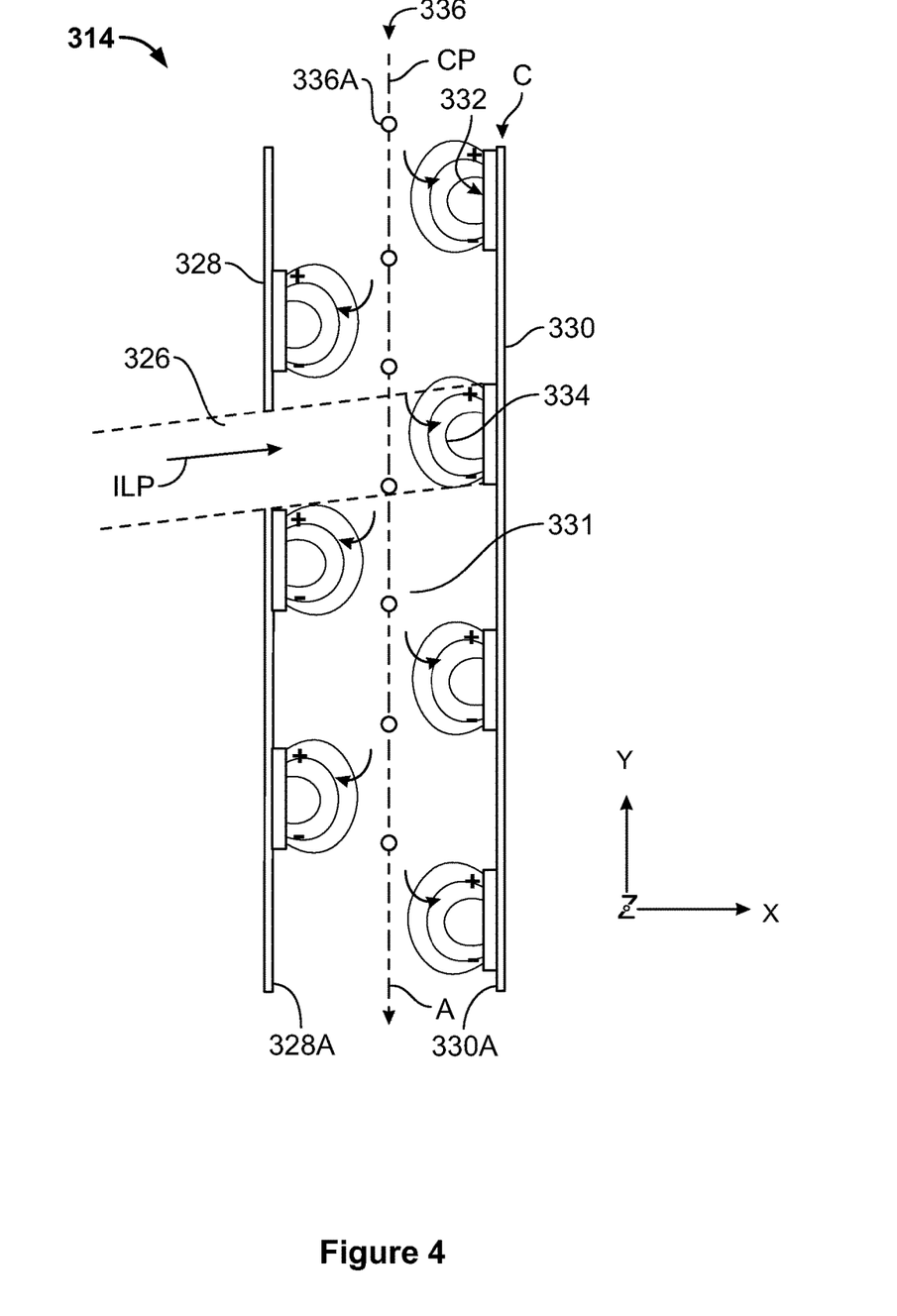
FIG. 4 is a cross-section view of a portion of another solar receiver according to an embodiment of the disclosure.

FIG. 4 illustrates another embodiment of the disclosure having the same basic arrangement as shown on FIG. 3 but having opposing magnets removed such that no magnet is on the opposing interior surface from one another, thereby imparting more of a zig-zag motion to the falling particles 336A that increases residence time.

Figure 5:
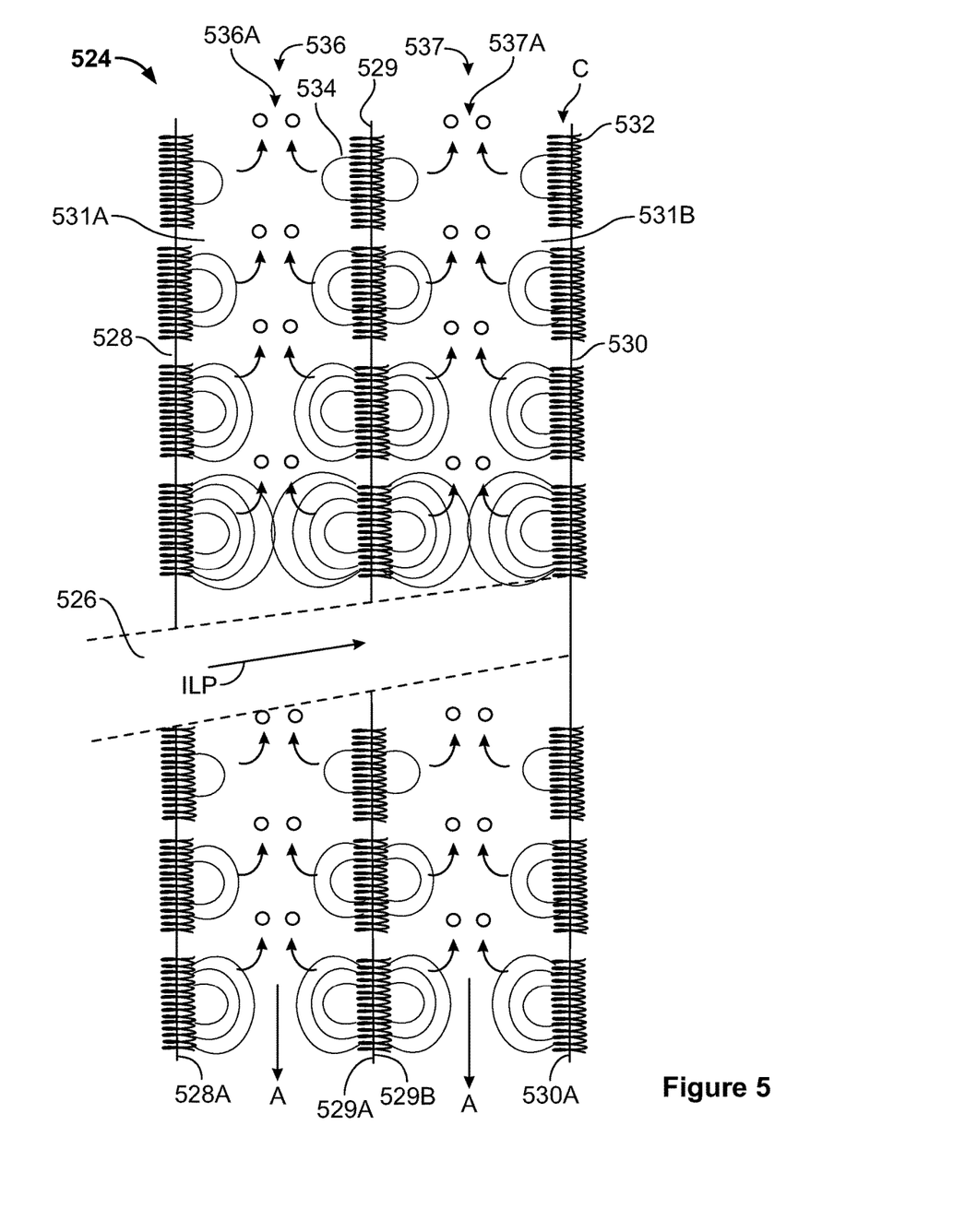
FIG. 5 is a cross-section view of a portion of another solar receiver according to an embodiment of the disclosure.

FIG. 5 shows a cross-section of a portion of another receiver body 524 according to an embodiment of the disclosure. As can be seen in FIG. 5, the receiver body 524 includes a front wall 528 and a rear wall 530. Disposed between the front and rear walls 528, 530 is an interior wall 529.

The front and interior walls 528, 529 and the interior and rear walls 529, 530, at least partially define first and second interior spaces 531A, 531B, respectively. The front and rear walls 528, 530 include front and rear interior sides 528A, 530A, respectively. The interior wall 529 includes a first interior side 529A and a second interior side 529B as shown.

The front, interior and rear walls 528, 529, 530 have a plurality of magnets 532 attached to or disposed thereupon. The magnets 532 create magnetic fields represented by magnetic field lines 534. In this exemplary embodiment, the magnets 532 are electromagnets. In another embodiment, the magnets 532 may be permanent magnets attached to the interior walls of the front, interior and rear walls 528, 529, 530. The plurality of magnets 532 are disposed in vertical columns C upon the front, interior and rear walls 528, 529, 530. A plurality of vertical columns (not shown) are placed along the Z axis (as discussed analogously regarding FIGS. 1, 1A, 3) along the length L' of the particle curtain 536.

In FIG. 5, two inlets (not shown) are used to form first and second particle curtains 536, 537 (represented by a particles 536, 537, respectively, falling through the first and second interior spaces 531A, 531B, respectively, of the receiver body 524. In this exemplary embodiment, the particles 536, 537 forming the particle curtains 336, 537 are ferromagnetic particles as discussed above. The particle curtains 536, 537 have widths W' and lengths L', and interact with the magnets 532 as discussed above in a manner analogous to the embodiment discussed regarding FIG. 2.

In this exemplary embodiment, the receiver body 524 has two channels for falling particle flow. It should be appreciated that the receiver system would be modified to accommodate providing particles to two inlets, such as by adding additional hoppers, particles conveyors as necessary. In other embodiments, the receiver body may have two or more inlets for creating two or more corresponding particle curtains, with the receiver system being modified as necessary.

Figure 6:
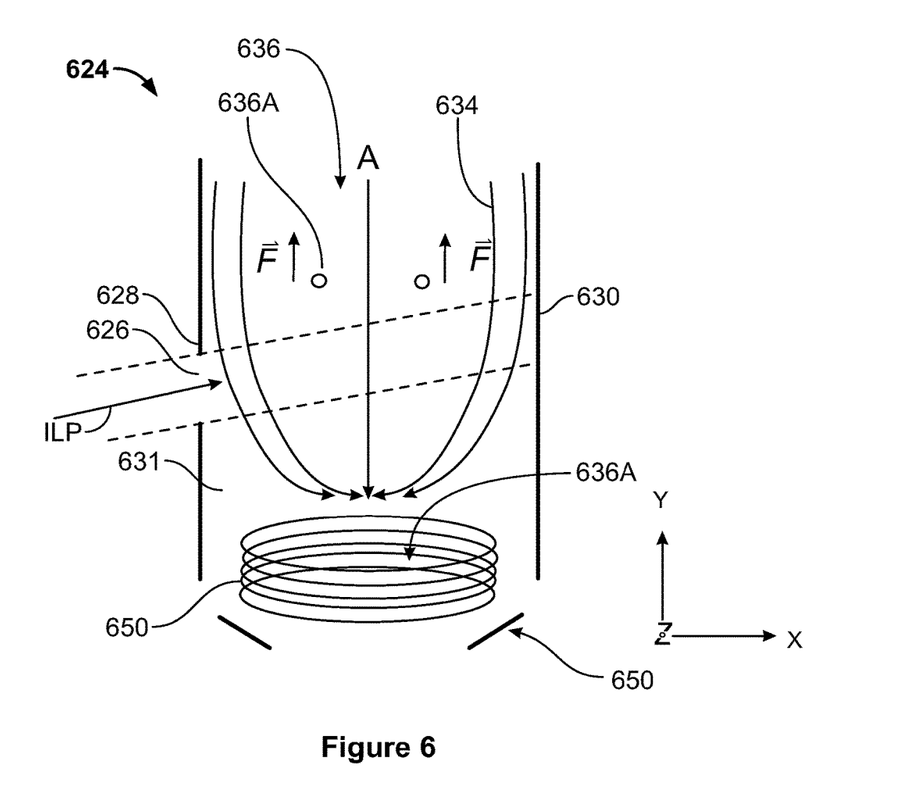
FIG. 6 is a cross-section view of a portion of another solar receiver according to an embodiment of the disclosure.

FIG. 6 is a cross-section of a portion of another receiver body 624 according to an embodiment of the disclosure. As can be seen in FIG. 6, the receiver body 624 includes a front wall 628 and a rear wall 630 that at least partially define an interior space 631. The receiver system (see discussion above regarding additional components of the receiver system) includes a magnetic field generator 650 that generates magnetic field lines 634 within the interior space 631. In this exemplary embodiment, the magnetic field generator 650 is disposed in the interior space 631 and the particle curtain 636 falls through a through opening or aperture 636A of the magnetic field generator 650.

In other embodiments, the magnetic field generator 650 may disposed outside of the interior space 631 while imposing a magnetic field within the interior space 631. Also in this exemplary embodiment, the magnetic field generator 650 is shown having a cylindrical shape having a circular cross section perpendicular to the magnetic field lines 634. In other embodiments, the magnetic field generator 650 may have other cross-sections, such as, but not limited to cylindrical. Additionally in this exemplary embodiment, a single magnetic field generator 650 is used. In other embodiments, one or more magnetic field generators may be used.

In this exemplary embodiment, the receiver system also includes two additional magnets 660. The additional magnets 660 may be part of the receiver body 624 or may be part of the receiver system proximate to the receiver body 624. The additional magnets 660 also generate magnetic field lines (not shown) within the receiver body 624. In another embodiment, the receiver system may include one or more magnets 660. In this exemplary embodiment, the magnets 660 are permanent magnets, such as those disclosed above. In other embodiments, the magnets 660 may be permanent and/or electromagnets.

In FIG. 6, a particle curtain 636 (represented by a single particle 636A) falls through the interior space 631 of the receiver body 624. In this exemplary embodiment, the particles 636A forming the particle curtain 636 are diamagnetic particles as discussed above. In other embodiments, the particles 636A may be ferromagnetic, as discussed above, or charged particles. The charged particles may be any of the materials discussed in this disclosure, such as, but not limited to metal oxides, carbon materials and ceramics. In an embodiment, the metal oxides may iron oxides. As in previous embodiments, the particle curtain 636 has a rectangular cross-section. However, in other embodiments, the particle curtain 636 may have a rectangular, square, circular, elliptical or other geometric shape.

The particles 636A are heated by concentrated solar light or energy traveling through the window 626 along an incident light path ILP. The amount of heat the particles 636A can absorb is dependent upon the residence time of the particles in the interior space 631, and mostly dependent upon the residence time of the particles 636A in the incident light path ILP. The magnetic field generator 650 and magnets 660 effect the residence time of the particles 636A by applying a force F to the particles 636A to create a "buoyancy effect" that offsets gravity and slows the fall of particles 36A through the interior space 31. The applied force also effects the path of the particles 636A, for example by imparting spin to the particles.

In other embodiments that embody the principles of the invention, diamagnetic, ferromagnetic or charged particles may be used in the arrangements of FIGS. 2-6 and various embodiments such that the particles of the various charge and/or magnetic field properties are effected by the magnetic fields of the magnets to attract and repel the charged particles to and from opposite and the same charged poles or fields, thereby increasing residence time within the receiver body and to shape and/or effect the flow path and characteristics of the falling particles.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A falling particle solar receiver, comprising:
    a receiver body comprising one or more walls defining an interior space;
    a window in the receiver body for allowing concentrated solar energy to enter the interior space;

an inlet for allowing particles to enter and fall through the interior space; and a magnetic field generating component configured to induce a magnetic field upon the particles falling through the interior space.

2. The falling particle solar receiver of claim 1, wherein the magnetic field generating component is one or more permanent magnets.

3. The falling particle solar receiver of claim 1, wherein the magnetic field generating component is magnetic field generator.

4. The falling particle solar receiver of claim 1, wherein the magnetic field generating component is positioned above the window.

5. The falling particle solar receiver of claim 2, wherein the one or more permanent magnets are disposed on at least one of the one or more walls defining the interior space.

6. The falling particle solar receiver of claim 3, wherein the magnetic field generator includes a passage for allowing the particles to pass therethrough.

7. A falling particle solar receiver system, comprising:
a particle feed system;
a falling particle solar receiver for receiving particles from the particle feed system; and
a collection system for receiving particles discharged from the falling particle solar receiver;
wherein the falling particle solar receiver comprises:
a receiver body comprising one or more walls defining an interior space;
a window in the receiver body for allowing concentrated solar energy to enter the interior space;
an inlet for allowing particles to enter and fall through the interior space; and
a magnetic field generating component configured to induce a magnetic field upon the particles falling through the interior space.

8. The falling particle solar receiver system of claim 7, wherein the magnetic field generating component is one or more permanent magnets.

9. The falling particle solar receiver system of claim 7, wherein the magnetic field generating component is magnetic field generator.

10. A method of heating particles in a falling particle receiver, comprising:
providing a plurality of particles to the receiver;
heating the particles falling through the receiver; and
subjecting the particles to a magnetic field as the particles fall through the receiver.

11. The method of claim 10, wherein the magnetic field is from a permanent magnet.

12. The method of claim 10, wherein the magnetic field is from a magnetic field generator.

13. The method of claim 10, wherein the particles are selected from a group consisting of diamagnetic particles, ferromagnetic particles and charged particles.

* * * * *